(12) United States Patent
Yoshida et al.

(10) Patent No.: US 10,289,498 B2
(45) Date of Patent: May 14, 2019

(54) MEMORY DEVICE SYSTEM

(71) Applicants: DENSO CORPORATION, Kariya, Aichi-pref. (JP); SEIKO EPSON CORPORATION, Tokyo (JP)

(72) Inventors: Naoki Yoshida, Kariya (JP); Kiminori Nakajima, Minowa-machi (JP)

(73) Assignees: DENSO CORPORATION, Kariya (JP); SEIKO EPSON CORPORATION, Tokyo (JP)

( * ) Notice: Subject to any disclaimer, the term of this patent is extended or adjusted under 35 U.S.C. 154(b) by 10 days.

(21) Appl. No.: 15/540,415

(22) PCT Filed: Dec. 24, 2015

(86) PCT No.: PCT/JP2015/006433
§ 371 (c)(1),
(2) Date: Jun. 28, 2017

(87) PCT Pub. No.: WO2016/113826
PCT Pub. Date: Jul. 21, 2016

(65) Prior Publication Data
US 2018/0004608 A1    Jan. 4, 2018

(30) Foreign Application Priority Data

Jan. 16, 2015  (JP) .................. 2015-007031

(51) Int. Cl.
*G06F 11/00* (2006.01)
*G06F 11/14* (2006.01)
(Continued)

(52) U.S. Cl.
CPC ...... *G06F 11/1469* (2013.01); *G06F 11/1076* (2013.01); *G06F 11/1451* (2013.01);
(Continued)

(58) Field of Classification Search
None
See application file for complete search history.

(56) References Cited

U.S. PATENT DOCUMENTS 5,499,384 A * 3/1996 Lentz .................... G06F 13/124
710/1
5,828,860 A * 10/1998 Miyaoku ............ G06F 9/30043
712/207

(Continued)

FOREIGN PATENT DOCUMENTS

| JP | S63-068200 A | 3/1988 |
|----|-------------|--------|
| JP | 07-160587 A | 6/1995 |
| JP | 2011-154593 A | 8/2011 |

*Primary Examiner* — Daniel F. McMahon
(74) *Attorney, Agent, or Firm* — Posz Law Group, PLC

(57) ABSTRACT

A memory device system is provided. The memory device includes a first memory, a second memory, a first register, a second register, a comparator, a transfer register, an error data register, an error address register, a parity calculation portion, and a controller. The first memory has m lines of addresses in which pieces of data are stored, and a parity bit. The second memory has m lines of addresses in which same pieces of data as the data stored in the first memory are stored. The first register is connected with the first memory. The second register is connected with the second memory. The transfer register stores a piece of data of the first memory. The error data register stores a piece of data of the second register. The error address register stores an address of the second memory. The parity calculation portion calculates parity of all pieces of data.

6 Claims, 2 Drawing Sheets

(51) Int. Cl.
*G06F 11/10* (2006.01)
*G06F 11/16* (2006.01)

(52) U.S. Cl.
CPC ...... *G06F 11/167* (2013.01); *G06F 2201/805* (2013.01); *G06F 2201/82* (2013.01)

(56) References Cited

U.S. PATENT DOCUMENTS

| | | | | |
|---|---|---|---|---|
| 8,291,154 | B2* | 10/2012 | Asauchi | B41J 2/17513 347/19 |
| 2004/0025086 | A1* | 2/2004 | Gorday | G01R 31/317 714/37 |
| 2005/0149781 | A1* | 7/2005 | Lempel | G06F 11/073 714/718 |
| 2006/0080589 | A1* | 4/2006 | Holm | G06F 11/1008 714/763 |
| 2009/0300452 | A1* | 12/2009 | Ichimiya | G06F 11/1443 714/748 |
| 2010/0122150 | A1* | 5/2010 | Tsutsui | G06F 11/1016 714/801 |
| 2013/0246886 | A1* | 9/2013 | Uchiyama | H03M 13/09 714/758 |
| 2015/0254128 | A1* | 9/2015 | Satoyama | G06F 12/16 714/15 |

* cited by examiner

MEMORY DEVICE SYSTEM

CROSS REFERENCE TO RELATED APPLICATIONS

The present application is a U.S. national stage of International Patent Application No. PCT/JP2015/006433 filed on Dec. 24, 2015 and is based on Japanese Patent Application No. 2015-7031 filed on Jan. 16, 2015, the disclosure of which is incorporated herein by reference.

TECHNICAL FIELD

The present disclosure relates to a memory device system including a first memory and a second memory.

BACKGROUND ART

There has been proposed a memory device system that includes a first memory and a second memory (a duplicated memory) formed so as to store the same data, and a comparator that compares the data stored in the first memory with the data stored in the second memory to determine whether the data is normal or abnormal (for example, Patent Literature 1). Specifically, in such a memory device system, the data stored in each of the first memory and the second memory is once stored into each of a first register and a second register, and the comparator reads the data stored in the first memory and the data stored in the second memory for comparison. Incidentally, in such a memory device system, all pieces of the data stored in each of the first memory and the second memory are stored into each of the first register and the second register at a time.

PRIOR ART LITERATURES

Patent Literature

Patent Literature 1: JP 2011-154593 A

SUMMARY OF INVENTION

However, in the above memory device system, since the data stored in each of the first memory and the second memory is stored into each of the first register and the second register at a time, required capacities for the first register and the second register are large, and the sizes thereof are thus apt to be increased. Further, since the comparator compares the data of the first memory with the data of the second memory at a time, it needs to have a processing capacity in accordance with the capacities of the first memory and the second memory, and the size of the capacitor is thus apt to be increased.

It is an object of the present disclosure to provide a memory device system capable of reducing sizes of a first register, a second register, and a comparator.

According to one aspect of the present disclosure, a memory device system includes: a first memory that has m lines (m is an integer not smaller than 2) of addresses and in which different pieces of data are respectively stored at the m lines of addresses, and a parity bit detecting an error of data is stored; a second memory that has m lines (m is an integer not smaller than 2) of addresses and in which same pieces of data as the pieces of data stored in the first memory are stored in an initial state; a first register that is connected with the first memory and stores only one piece of data divided into m pieces and stored in the first memory, in an order of the addresses in the first memory; a second register that is connected with the second memory and stores one piece of data divided into m pieces and stored in the second memory, the one piece of data having an address same as the address of the data of the first memory stored in the first register; a comparator that compares the piece of data stored in the first memory with the piece of data stored in the second memory; a transfer register that stores the piece of data of the first memory having been compared in the comparator; an error data register that stores the piece of data of the second register when the comparator determines that there is no matching between the piece of data of the first register and the piece of data of the second register; an error address register that stores an address of the second memory for the piece of data stored in the second register when the comparator determines that there is no matching between the piece of data of the first register and the piece of data of the second register; a parity calculation portion that calculates parity of all pieces of data stored in the transfer register and determines whether there is matching between the parity and the parity bit; and a controller that performs a predetermined control based on a calculation result by the parity calculation portion. After all pieces of data stored in the first memory are stored into the transfer register, the controller causes the parity calculation portion to determine whether there is matching between the parity of all pieces of data stored in the transfer register and the parity bit. When the parity calculation portion determines that there is parity matching, the controller causes the transfer register to transmit all pieces of data stored in the transfer register to an external circuit. When the parity calculation portion determines that there is no parity matching, the controller replaces the piece of data at the address stored in the error address register, out of the pieces of data stored in the transfer register, with the piece of data stored in the error data register, and then causes the parity calculation portion to again determine whether there is matching between the parity of all pieces of data stored in the transfer register and the parity bit, and when the parity calculation portion determines that there is parity matching, the parity calculation portion causes the transfer register to transmit all pieces of data stored in the transfer register to the external circuit.

According to the configuration, only the data divided into m pieces and stored in each of the first memory and the second memory, namely only a piece of data at one address, is stored into each of the first register and the second register. Further, the comparator compares the piece of data at one address stored in the first register with the piece of data at one address stored in the second register. Hence, the first register, the second register, and the comparator only have to handle a piece of data at one address, which leads to reduction in size.

After all pieces of data stored in the first memory have been stored into the transfer register, it is determined whether there is matching between the parity bit previously stored in the first memory and parity with respect to all pieces of data. When the data stored in the transfer register is abnormal (when there is no parity matching), the piece of data at the address stored in the error address register out of the pieces of data stored in the transfer register is replaced with the piece of data stored in the error data register. Thereafter, when the data after the replacement is normal (when there is parity matching), the data is transmitted to the external circuit. Accordingly, even when abnormality (a failure) occurs in a piece of data at one address of each of the first memory and the second memory, normal operation can be performed, to allow reduction in failure rate of the memory device system as a whole.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Hereinafter, embodiments of the present disclosure will be described with reference to the drawings. Incidentally, the same or similar portions in the embodiments below are provided with the same numeral and described.

(First Embodiment)

Figure 1:
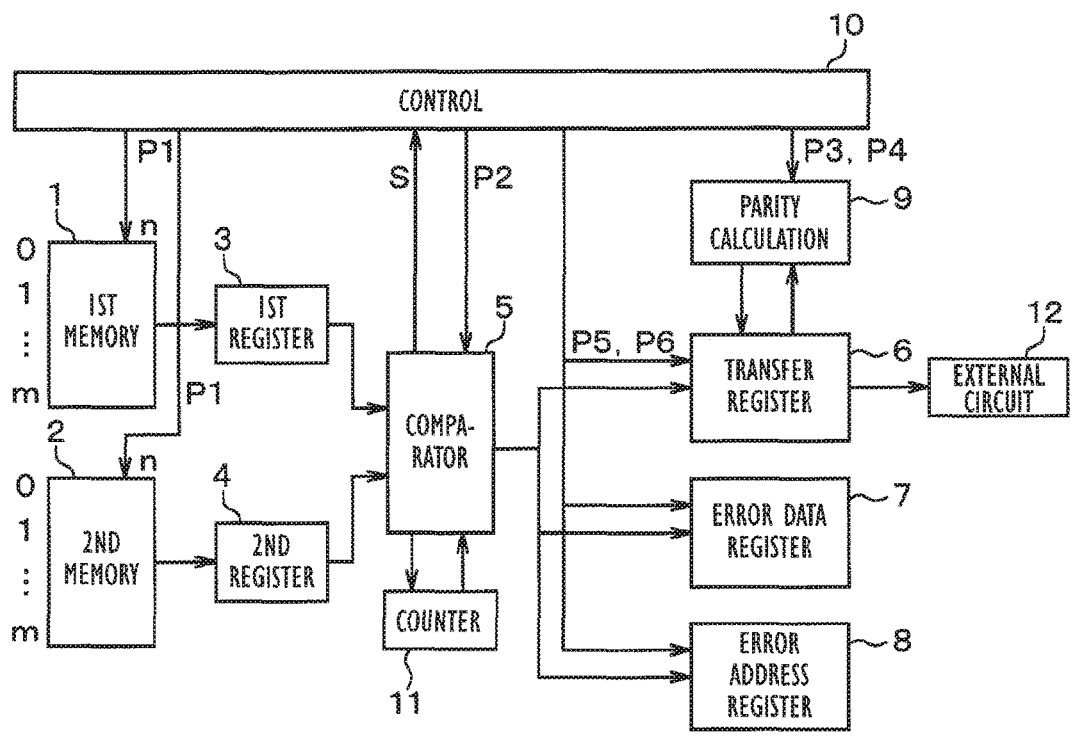
FIG. 1 is a diagram schematically illustrating a whole configuration of a memory device system according to a first embodiment of the present disclosure.

A first embodiment of the present disclosure will be described with reference to the drawings. As shown in FIG. 1, the memory device system of the present embodiment includes a first memory 1, a second memory 2, a first register 3, a second register 4, a comparator 5, a transfer register 6, an error data register 7, an error address register 8, a parity calculation portion 9, and a controller 10. In the present embodiment, the parity calculation portion 9 corresponds to the parity calculation portion of the present disclosure, and the controller 10 corresponds to the controller of the present disclosure.

Each of the first memory 1 and the second memory 2 is a nonvolatile memory having m (m is an integer not smaller than 2, and can be represented as m=2, 3, 4 . . . ) lines of addresses, with an address length of n (n is an integer not smaller than 1, and can be represented as n=1, 2, 3 . . . ) bits. In an initial state, the same data is stored in each of the first memory 1 and the second memory 2. That is, data is redundantly stored in each of the first memory 1 and the second memory 2 in the initial state. In the present embodiment, m and n are selected such that m+n is the minimum integer with respect to a total number of bits. For example, when the total number of bits is 512, m+n is set to 9.

Further, in each of the first memory 1 and the second memory 2, a different piece of data is stored at each address. In the present embodiment, the respective addresses store: pieces of data such as a power supply voltage, a frequency, and a reference current that are used in an adjustment mechanism of a control circuit for controlling a physical quantity sensor that outputs a sensor signal in accordance with a physical quantity, such as an acceleration sensor, an angular velocity sensor, or a pressure sensor; and pieces of data such as an offset value, a sensitivity adjustment value, and a temperature adjustment value that are used at the time of performing characteristic adjustment, such as offset adjustment and sensitivity adjustment, on each physical quantity sensor.

Further, a parity bit as an error detection function is previously stored into at least one address in the first memory 1 and the second memory 2. In other words, at least one parity bit is stored in the first memory 1 and the second memory 2 as a whole in advance. In the present embodiment, the parity bit is set such that the number of "1" in a piece of data of the parity bit and bits other than the parity bit is constantly set to be an even number, to be made so-called even parity. The parity bit may be so-called odd parity that is set such that the number of "1" in pieces of data of the parity bit and bits other than the parity bit is constantly an odd number.

Each of the first memory 1 and the second memory 2 sequentially stores one piece of data, divided into m pieces, into each of the first register 3 and the second register 4. That is, the first memory 1 and the second memory 2 sequentially respectively store a piece of data at one address into the first register 3 and the second register 4. The first register 3 and the second register 4 are configured so as to be able to store only one piece of data at one address of each of the first memory 1 and the second memory 2, and temporarily store only one piece of data at one address of each of the first memory 1 and the second memory 2.

The comparator 5 sequentially compares the pieces of data stored in the first register 3 and the second register 4. That is, since a piece of data at one address is stored into each of the first register 3 and the second register 4 sequentially from each of the first memory 1 and the second memory 2, the comparator 5 sequentially compares the stored pieces of data. When determining that the pieces of data stored in the first register 3 and the second register 4 are the same, the comparator 5 stores the piece of data of the first register 3 into the transfer register 6 to update a counter 11 connected with the comparator 5. On the other hand, when determining that the pieces of data stored in the first register 3 and the second register 4 are different from each other, the comparator 5 stores the piece of data of the first register 3 into the transfer register 6 and also stores the piece of data of the second register 4 into the error data register 7. After storing a value of the counter 11 at that time into the error address register 8, the comparator 5 updates the counter 11.

When the comparator 5 sequentially compares the pieces of data stored in the first register 3 and the second register 4, and determines that the pieces of data stored in the first register 3 and the second register 4 are different twice from the start of the comparison, the comparator 5 transmits a control signal S to the controller 10 and completes the comparison. That is, when all pieces of data stored at the respective addresses of the first register 3 and the second register 4 match, or when only one piece of data stored at each address of the first register 3 and the second register 4 is different, all pieces of data of the first memory 1 are first stored into the transfer register 6.

As described above, a various pieces of data are stored into the transfer register 6, the error data register 7, and the error address register 8 on the basis of the results of the comparison by the comparator 5. Then, the transfer register 6 transmits all or some pieces of data stored therein to an external circuit 12 on the basis of a result of calculation in the parity calculation portion 9 described later. Incidentally, the external circuit 12 is a control circuit or the like that performs control by using the data stored in each of the first memory 1 and the second memory 2.

When a piece of data (a piece of data at an address 0 of the first memory 1) is first inputted into the transfer register 6, the parity calculation portion 9 calculates parity of the inputted piece of data (whether the number of "1" in the bit data at each address is an odd number or an even number). Further, when subsequent pieces of data are inputted into the transfer register 6, the parity calculation portion 9 calculates parity of each piece of the inputted data and calculates a sum of this parity and the already calculated parity. That is, the parity calculation portion 9 calculates parity with respect to all pieces of inputted data.

When all pieces of data stored in the first memory are stored into the transfer register 6, the parity calculation portion 9 determines whether there is matching between the parity bit previously stored in the first memory 1 and the parity with respect to all pieces of data. That is, the parity calculation portion 9 determines whether the data inputted into the transfer register 6 is normal or abnormal.

The controller 10 is configured by a CPU, a variety of memories configuring a memory portion, a peripheral, or the like, and is connected with the first memory 1, the second memory 2, the comparator 5, the transfer register 6, the error data register 7, the error address register 8, the parity calculation portion 9, the counter 11, a notification portion (not shown), or the like.

Then, based on the value of the counter 11, the controller 10 transmits a control signal P1 to each of the first memory 1 and the second memory 2 and causes each of the first memory 1 and the second memory 2 to store, into each of the first register 3 and the second register 4, a piece of data at an address with the value of the counter 11 out of the pieces of data stored in each of the first memory 1 and the second memory 2. Further, the controller 10 transmits a control signal P2 and causes the comparator 5 to read the piece of data stored in each of the first register 3 and the second register 4 for comparison. The controller 10 then transmits a control signal P3 and causes the parity calculation portion 9 to calculate parity of the piece of data stored in the transfer register 6.

When the value of the counter 11 is m, namely when all pieces of data stored in the first memory 1 and the second memory 2 are compared, the controller 10 transmits a control signal P4 and causes the parity calculation portion 9 to determine whether there is matching between the parity bit previously stored in the first memory 1 and the parity with respect to all pieces of data.

The controller 10 then reads a result of the determination in the parity calculation portion 9. When the parity calculation portion 9 determines that the data stored in the transfer register 6 is normal, the controller 10 transmits a control signal P5 and causes the transfer register 6 to transmit the data stored in the transfer register 6 to the external circuit 12. On the other hand, when the parity calculation portion 9 determines that the data stored in the transfer register 6 is abnormal, the controller 10 replaces the piece of data at the address stored in the error address register 8, out of the pieces of data stored in the transfer register 6, with the piece of data stored in the error data register 7. That is, the controller 10 replaces the piece of data with the other piece of data (the piece of data of the second memory 2) out of the pieces of data that is stored in the first register 3 and the second register 4 and that have been determined as different in the comparator 5. Thereafter, the controller 10 transmits the control signal P4 to the parity calculation portion 9 again and causes the parity calculation portion 9 to determine whether there is matching between the parity bit previously stored in the first memory 1 and the parity with respect to all pieces of data.

When the parity calculation portion 9 determines that the data stored in the transfer register 6 is normal, the controller 10 transmits a control signal P5 and causes the transfer register 6 to transmit the data stored in the transfer register 6 to the external circuit 12. On the other hand, when the parity calculation portion 9 determines that the data stored in the transfer register 6 is abnormal, the controller 10 transmits a control signal P6 and causes the transfer register 6 to transmit the pieces of data except for the replaced piece of data, out of the pieces of data stored in the transfer register 6, to the external circuit 12. Then, the controller 10 notifies that the piece of data (a control device) stored at the above address is not valid, through a voice portion, a video portion, or the like as the notification portion.

Figure 2:
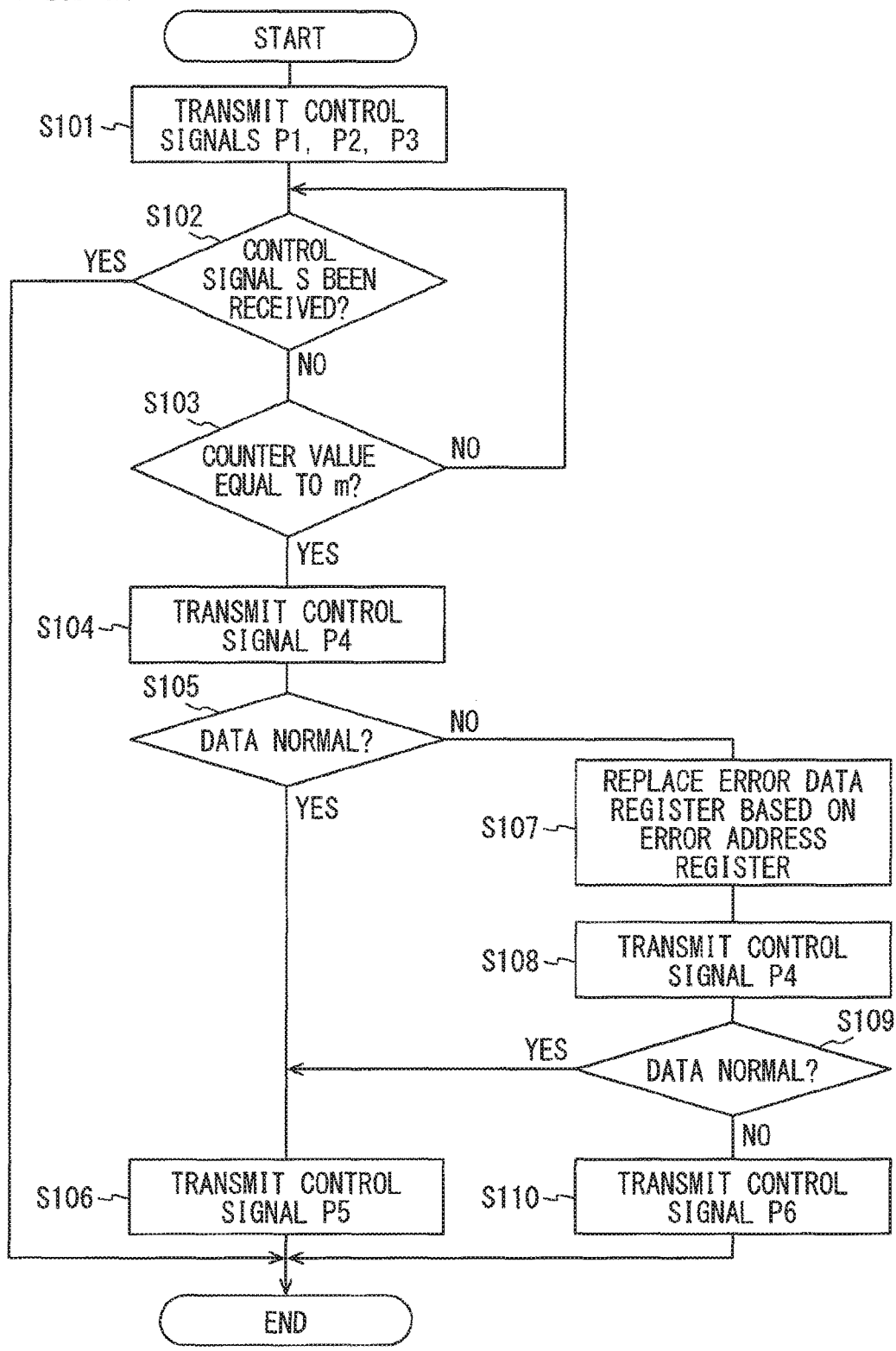
FIG. 2 is a flowchart performed by a controller shown in FIG. 1.

The above is the configuration of the memory device system in the present embodiment. Next, the operation of the controller 10 in the memory device system will be specifically described with reference to FIG. 2. The memory device system of the present embodiment is mounted on a vehicle, for example, and starts the following operation when an ignition switch is turned on.

First, the control signals P1 to P3 are transmitted (S101). By this transmission, since the value of the counter 11 is initially set to 0, a piece of data at an address 0, out of the pieces of data stored in each of the first memory 1 and the second memory 2, is stored from each of the first memory 1 and the second memory 2 into each of the first register 3 and the second register 4 (the control signal P1). The pieces of data stored in the first register 3 and the second register 4 are read in the comparator 5, and when the pieces of data stored in the first register 3 and the second register 4 are the same, the piece of data of the first register 3 is stored into the transfer register 6, and the value of the counter 11 is updated. On the other hand, when the pieces of data stored in the first register 3 and the second register 4 are different from each other, the piece of data of the first register 3 is stored into the transfer register 6, and the piece of data of the second register 4 is stored into the error data register 7. The value of the counter 11 at that time is stored into the error address register 8, and thereafter, the counter 11 is updated (the control signal P2). Further, since the piece of data is stored from the comparator 5 into the transfer register 6, parity of the piece of data stored into the transfer register 6 is calculated in the parity calculation portion 9 (the control signal P3).

Subsequently, it is determined whether the control signal S has been received from the comparator 5 (S102). When the control signal S is received from the comparator 5 (S102: YES), the pieces of data at two addresses out of the pieces of data stored in each of the first memory 1 and the second memory 2 are different, and hence the processing is completed. In the present embodiment, at the time of completing the processing, it is notified through the notification portion that the data stored in each of the first memory 1 and the second memory 2 is not valid.

When the control signal S has not been received from the comparator 5 (S102: NO), it is determined whether the value of the counter 11 is m (S103). When the value of the counter 11 is not m (S103: NO), the operations of S101 and S102 are repeatedly performed. That is, the pieces of data at all addresses stored in the first memory 1 and the second memory 2 are compared. When the value of the counter 11 is m (S103: YES), since the comparison of the pieces of data stored at the respective addresses in the first memory 1 and the second memory 2 has been completed, the control signal P4 is transmitted to cause the parity calculation portion 9 to determine whether there is matching between the parity bit previously stored in the first memory 1 and the parity with respect to all pieces of data. That is, it is determined whether the data inputted into the transfer register 6 is normal or abnormal (S104).

A result of the calculation by the parity calculation portion 9 is then read, and when the parity calculation portion 9 determines that the data stored in the transfer register 6 is normal (S105: YES), the control signal P5 is transmitted to output the data of the transfer register 6 to the external circuit 12, and the processing is completed (S106). On the other hand, when the parity calculation portion 9 determines that the data stored in the transfer register 6 is abnormal (S105: NO), the piece of data stored in the error address register 8 (the address of the piece of data stored in the error data register 7) and the piece of data stored in the error data register 7 are read. Then, out of the pieces of data stored in the transfer register 6, the piece of data at the address stored in the error address register 8 is replaced with the piece of data stored in the error data register 7 (S107).

Thereafter, the control signal P4 is transmitted again to cause the parity calculation portion 9 to determine whether there is matching between the parity bit previously stored in the first memory 1 and the parity with respect to all pieces of data (S108).

A result of the calculation by the parity calculation portion 9 is then read, and when the parity calculation portion 9 determines that the data stored in the transfer register 6 is normal (S109: YES), the control of S106 described above is performed to output the data of the transfer register 6 to the external circuit 12. On the other hand, when the parity calculation portion 9 determines that the data stored in the transfer register 6 is abnormal (S109: NO), the control signal P6 is transmitted to the transfer register 6 to output the other pieces of data except for the replaced piece of data, out of the pieces of data stored in the transfer register 6, from the transfer register 6 to the external circuit 12. In the present embodiment, when the control signal P6 is transmitted to complete the processing, it is notified that the piece of data (the control device) stored at the above address is not valid, through the voice portion, the video portion, or the like as the notification portion.

As described above, in the present embodiment, the same data is stored into each of the first memory 1 and the second memory 2 in the initial state, and a piece of the stored data at each one address is stored into each of the first register 3 and the second register 4. Further, the comparator 5 sequentially compares a piece of data at one address stored in the first register 3 with a piece of data at one address stored in the second register 4. Therefore, the first register 3, the second register 4, and the comparator 5 only have to handle a piece of data at one address, which leads to reduction in size.

After all pieces of data stored in the first memory 1 have been stored into the transfer register 6, it is determined whether there is matching between the parity bit previously stored in the first memory 1 and the parity with respect to all pieces of data. When the data stored in the transfer register 6 is abnormal, the piece of data at the address stored in the error address register 8, out of the data stored in the transfer register 6, is replaced with the piece of data stored in the error data register 7. When the data after the replacement is normal, the data stored in the transfer register 6 is transmitted to the external circuit 12. Accordingly, even when the abnormality occurs in a piece of data at one address of each of the first memory 1 and the second memory 2, normal operation can be performed, to allow reduction in failure rate of the memory device system as a whole.

When the data after the replacement is abnormal, the other pieces of data except for the replaced piece of data, out of the pieces of data stored in the transfer register 6, are outputted from the transfer register 6 to the external circuit 12. Accordingly, even when abnormality has occurred in a piece of data at one address of each of the first memory 1 and the second memory 2 (the piece of data at the replaced address), the pieces of data at the other addresses can be used as they are.

Moreover, in the present embodiment, m+n is selected so as to be the minimum integer with respect to a total number of bits, thereby allowing further size reduction.

(Other Embodiments)

The present disclosure is not restricted to the above embodiment, but can be appropriately modified within the scope described in the present disclosure.

For example, although the parity calculation portion 9 and the controller 10 are separately configured in the first embodiment, the parity calculation portion 9 may be incorporated into the controller 10. Further, although the control signal P2 is transmitted to cause the comparator 5 to read a piece of data stored in each of the first register 3 and the second register 4 in the first embodiment, a control signal may be transmitted to each of the first register 3 and the second register 4 to cause each of the first register 3 and the second register 4 to transmit a piece of data stored the first register 3 and the second register 4 to the comparator 5.

Moreover, in the first embodiment, m+n may not be selected to be the minimum integer with respect to a total number of bits.

Incidentally, the flowchart or the processing in the flowchart described in the present application is made up of a plurality of steps (or referred to as sections), and each step is represented by S101, for example. While each step can be divided into a plurality of sub-steps, a plurality of steps can be combined to form one step.

Although the embodiments, configurations, and aspects of the memory device system according to the present disclosure have been illustrated above, the embodiments, the configurations, and the aspects according to the present disclosure are not restricted to the foregoing embodiments, configurations, and aspects. For example, the scopes of the embodiments, the configurations, and the aspect according to the present disclosure include an embodiment, a configuration, and an aspect that are obtained by appropriately combining technical parts respectively disclosed in different embodiments, configurations, and aspects.

The invention claimed is:

1. A memory device system comprising:
a first memory that has m lines (m is an integer not smaller than 2) of addresses and in which different pieces of data are respectively stored at the m lines of addresses, and a parity bit detecting an error of data is stored;
a second memory that has m lines (m is an integer not smaller than 2) of addresses, the second memory storing pieces of data in an initial state that are the same as the pieces of data stored in the first memory;
a first register that is connected with the first memory and stores only one piece of data divided into m pieces and stored in the first memory, in an order of the addresses in the first memory;
a second register that is connected with the second memory and stores one piece of data divided into m pieces and stored in the second memory, the one piece of data having an address same as the address of the data of the first memory stored in the first register;
a comparator that compares the piece of data stored in the first memory with the piece of data stored in the second memory;
a transfer register that stores the piece of data of the first memory compared by the comparator;
an error data register that stores the piece of data of the second register when the comparator determines that there is no matching between the piece of data of the first register and the piece of data of the second register;

an error address register that stores an address of the second memory for the piece of data stored in the second register when the comparator determines that there is no matching between the piece of data of the first register and the piece of data of the second register;

a parity calculation portion that calculates parity of all pieces of data stored in the transfer register and determines whether there is matching between the parity and the parity bit; and a controller that performs a predetermined control based on a calculation result by the parity calculation portion, wherein:

after all pieces of data stored in the first memory are stored into the transfer register, the controller causes the parity calculation portion to determine whether there is matching between the parity of all pieces of data stored in the transfer register and the parity bit;

when the parity calculation portion determines that there is parity matching, the controller causes the transfer register to transmit all pieces of data stored in the transfer register to an external circuit;

when the parity calculation portion determines that there is no parity matching, the controller replaces the piece of data at the address stored in the error address register, out of the pieces of data stored in the transfer register, with the piece of data stored in the error data register, and then causes the parity calculation portion to again determine whether there is matching between the parity of all pieces of data stored in the transfer register and the parity bit, and when the parity calculation portion determines that there is parity matching, the parity calculation portion causes the transfer register to transmit all pieces of data stored in the transfer register to the external circuit.

2. The memory device system according to claim 1, wherein:

when the controller causes the parity calculation portion to again determine whether there is matching between the parity of all pieces of data stored in the transfer register and the parity bit, and when the parity calculation portion determines that there is no parity matching, the controller transmits to the external circuit other pieces of data except for the data at the address stored in the error address register out of the pieces of data stored in the transfer register.

3. The memory device system according to claim 1, wherein:

pieces of data are stored in each of the first memory and the second memory, the pieces of data being stored at respective addresses and being used by a control circuit controlling a physical quantity sensor that outputs a sensor signal in accordance with a physical quantity.

4. The memory device system according to claim 1, wherein:

pieces of data are stored in each of the first memory and the second memory, the pieces of data being stored at respective addresses and being used in adjustment of a characteristic of a physical quantity sensor that outputs a sensor signal in accordance with a physical quantity.

5. The memory device system according to claim 1, wherein:

the first memory and the second memory are nonvolatile memories.

6. The memory device system according to claim 1, wherein:

each of the first memory and the second memory has an address length of n (n is an integer not smaller than 1) bits; and the m and the n are selected such that m+n is a minimum integer with respect to a total number of bits.

* * * * *